(12) United States Patent
Bley

(10) Patent No.: US 7,353,506 B2
(45) Date of Patent: Apr. 1, 2008

(54) ACCESSING INFORMATION AT OBJECT CREATION

(75) Inventor: John B. Bley, San Mateo, CA (US)

(73) Assignee: Computer Associates Think, Inc., Islandia, NY (US)

( * ) Notice: Subject to any disclaimer, the term of this patent is extended or adjusted under 35 U.S.C. 154(b) by 814 days.

(21) Appl. No.: 10/692,250

(22) Filed: Oct. 23, 2003

(65) Prior Publication Data

US 2005/0091638 A1    Apr. 28, 2005

(51) Int. Cl.
*G06F 9/44* (2006.01)
*G06F 9/45* (2006.01)

(52) U.S. Cl. .................. 717/158; 717/127; 717/128; 717/130; 717/131; 717/159; 717/169

(58) Field of Classification Search ................ None
See application file for complete search history.

(56) References Cited

U.S. PATENT DOCUMENTS

| | | | |
|---|---|---|---|
| 5,655,081 A | 8/1997 | Bonnell et al. | |
| 5,898,873 A | 4/1999 | Lehr | |
| 5,978,594 A | 11/1999 | Bonnell et al. | |
| 6,314,430 B1 * | 11/2001 | Chang | 707/103 R |
| 6,332,212 B1 | 12/2001 | Organ et al. | |
| 2003/0195997 A1 * | 10/2003 | Ibert et al. | 709/318 |

* cited by examiner

*Primary Examiner*—Chuck Kendall
(74) *Attorney, Agent, or Firm*—Vierra Magen Marcus & DeNiro LLP

(57) ABSTRACT

A system is disclosed for accessing information about an object, where such information is available at the time of creation of the object but not necessarily available at all times later. In one embodiment, existing object code is modified to add the ability to access the information. The modified code is then executed.

33 Claims, 3 Drawing Sheets

ACCESSING INFORMATION AT OBJECT CREATION

BACKGROUND OF THE INVENTION

1. Field of the Invention

The present invention is directed to technology for accessing information about an object, where such information is available at the time of creation of the object but not necessarily available at all times later.

2. Description of the Related Art

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live web applications and web sites to make sure that they are running properly.

One particular scenario that web application developers seek to avoid is a task that runs too slowly or is otherwise not performing as expected. For example, it may be anticipated that a task will take a fraction of one second to complete its functions; however, due to something going wrong, the task executes for thirty seconds. A task running too slowly (or doing something else unexpected) can degrade performance of a web site, degrade performance of a web application, and cause an application to fail, or cause a web site to fail. Thus, there is a need to avoid poorly performing tasks.

When an application is performing poorly, the developer or administrator usually attempts to debug the software to figure out which code is causing the performance issues so that code can be fixed. While it is usually easy to detect when an application is performing poorly because the response time is noticeably slower, it is often very difficult to determine which portion of the software is responsible for the poor performance.

Application performance analysis tools are popular tools used to debug software and to analyze an application's run time execution. Many application performance analysis tools provide timing data on how long each method (or procedure or other process) is being executed, report how many times each method is executed and/or identify the function call architecture. Other functions can also be performed by various performance analysis tools. Some of the tools provide their results in text files or on a monitor. Other tools graphically display their results.

There are some instances where it desired to analyze performance of a task; however, all of the information needed to analyze the task is not available at the time that the task is performed. In some cases, the necessary information is available at the time an object or other software entity associated with the task is created, but may not be available at the time that object or other software entity is used.

Consider the example of a Java application establishing a connection to a relational database. The java.sql.Connection interface can be used to create a connection object representing the particular database session. The "prepareStatement" method of the connection object can be used to create a prepared statement object, which contains an SQL statement that has already been compiled. The "executeQuery" method of the prepared statement object can be used to cause the relational database that is the subject of the connection object to execute the SQL statement of the prepared statement object. Performance analysis tools can monitor a particular method. Thus, a performance analysis tool could monitor the "executeQuery" method of the prepared statement object in order to determine the execution time of the SQL statement of the prepared statement object. However, the "executeQuery" method takes no parameters. Therefore, the performance analysis tool is not able to access the actual SQL statement at the time it is monitoring the performance of the "executeQuery" method. Since the performance analysis tool cannot access the actual SQL statement, the timing data can be reported but not correlated to the SQL statement that was being monitored. Not knowing the actual SQL statement reduces the debugging and analysis value of the timing data.

While the performance analysis tool is not able to access the actual SQL statement at the time it is monitoring the performance of the SQL statement, it is able to access the SQL statement at the time that the prepared statement object was created. Thus, a system is needed to gain access to information about an object, where such information is available at the time of creation of the object but not necessarily available at all times later. This problem is relevant to many other situations in addition to the relational database connection example described above.

SUMMARY OF THE INVENTION

The present invention, roughly described, pertains to technology for accessing information about an object, where such information is available at the time of creation of the object but not necessarily available at all times later. In one embodiment, existing object code is modified to add the ability to access the information. The modified code can then be executed.

One embodiment of the present invention includes automatically adding first additional code to existing code that creates a first software entity, where the first additional code stores first data relevant to the first software entity. The first data is available when the first software entity is created. Second additional code is automatically added to existing code that uses the first software entity. The second additional code accesses second data relevant to the first software entity and correlates the second data with the first data. In one example, the first software entity is an object and the existing code is object code.

Another embodiment of the present invention includes modifying existing object code to add new functionality and executing the modified object code. The step of executing includes creating an object, storing first data relevant to the object, tracing the object to produce trace data and correlating the trace data to the first data. The steps of creating, storing and correlating are performed by new code added during the step of modifying. In one example of an implementation, the object mentioned above is for an SQL statement associated with a connection (e.g. an SQL query for a relational database connection), the first data accessed at object creation time is the SQL statement and the trace data is a measure of how long that query took to execute.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

DETAILED DESCRIPTION

One implementation of the present invention operates on Java code. For example purposes, the remaining portions of this document provide examples using Java code. However, the present invention applies to other programming languages and formats as well. Furthermore, the examples herein make use of the term "method," which has a specific meaning in reference to the Java programming language. For purposes of this document, "method" includes a Java method as well as other sets of instructions such as procedures, functions, routines, subroutines, sequences, processes, etc.

The present invention provides technology for accessing information about an object, where such information is available at the time of creation of the object but not necessarily available at all times later. In one embodiment, such access to the information is provided without requiring access to the source code. In one such implementation, access to the information is provided by modifying the application's object code (also called bytecode).

Object code can be generated by a compiler or an assembler. Alternatively, object code can be generated manually. Object code can be machine executable or suitable for processing to produce executable machine code. Modifying object code includes adding new instructions to the object code and/or modifying existing portions of the object code. Modifying object code typically does not involve accessing the source code. An example of modifying object code can be found in U.S. Pat. No. 6,260,187 "System For Modifying Object Oriented Code" by Lewis K. Cirne, incorporated herein by reference in its entirety.

Figure 1:
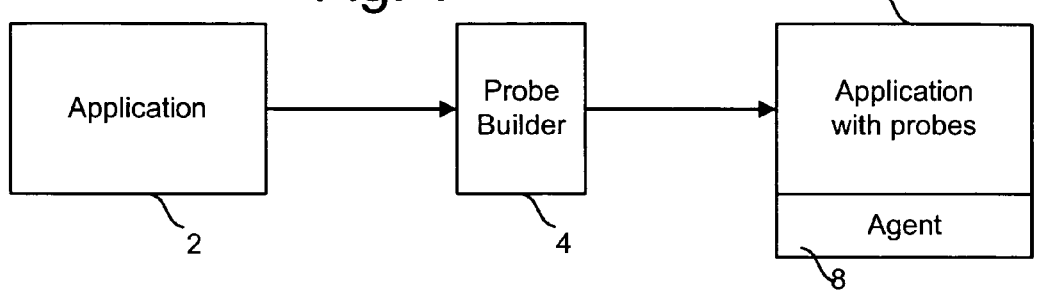
FIG. 1 is a block diagram describing how byte code for an application is instrumented.

FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the Java application before the probes are added. In embodiments that use programming languages other than Java, Application 2 can be a different type of application. Probe Builder 4 modifies the byte code for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the Java application is referred to as a managed application. In one embodiment, Probe Builder 4 operates automatically (e.g. without human assistance).

Figure 2:
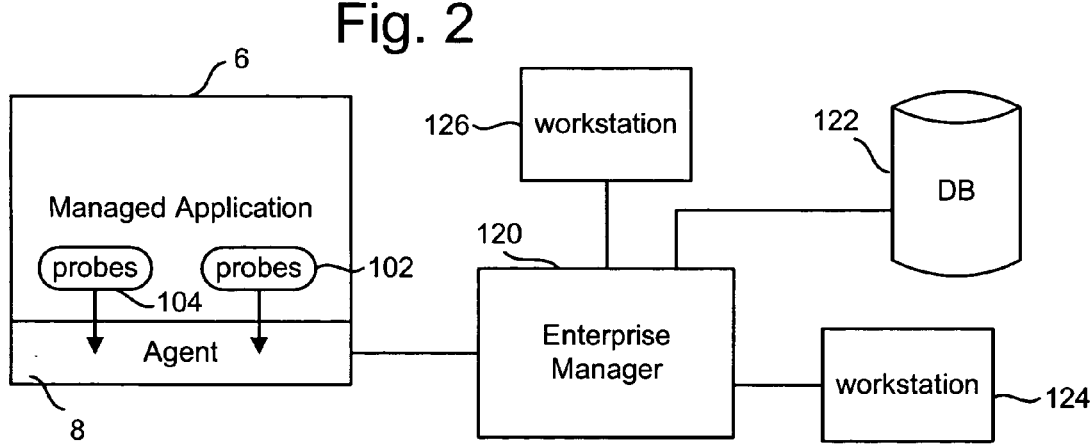
FIG. 2 is a block diagram of a system for monitoring an application. This system represents one example of a system that can implement the present invention.

FIG. 2 is a conceptual view of the components of one example of an application performance analysis tool that can implement one embodiment of the present invention. In addition to managed Application 6 with probes 102 and 104, FIG. 2 also depicts Enterprise Manager 120, database 122, workstation 124 and workstation 126. As a managed application runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way.

In one embodiment of the system, each of the components is running on different machines. That is, workstation 126 is on a first computing device, workstation 124 is on a second computing device, Enterprise Manager 120 is on a third computing device, managed Application 6 is running on a fourth computing device and Probe Builder 4 is running on a fifth computing device. In another embodiment, two or more of the components are operating on the same computing device. For example, managed application 6 and Agent 8 may be on a first computing device, Enterprise Manager 120 on a second computing device and a workstation on a third computing device. Alternatively, all of the components can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
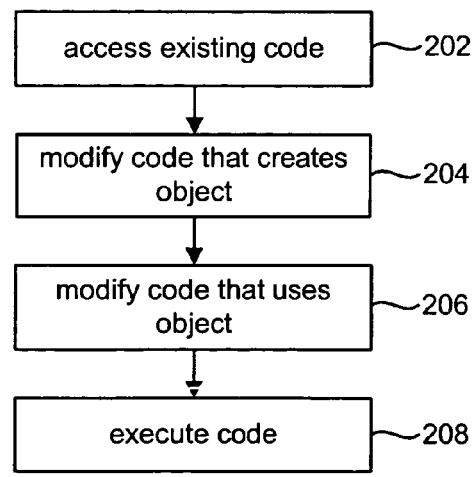
FIG. 3 is a flow chart describing one embodiment of a process for modifying existing code in order to add new functionality that access information about an object, where such information is available (at least) at the time of creation of the object.

FIG. 3 is a flow chart describing one embodiment of a process for modifying existing code in order to add new functionality that access information about an object, where such information is available (at least) at the time of creation of the object. In step 202, existing code is accessed. In one embodiment, as described above, probe builder 4 receives the object code for application 2. In other embodiment, code other than object code can be accessed. The accessed code is accessed in order to modify the code so that a particular object or other software entity (e.g. a process, function, procedure, etc.) can be traced and/or information about that object that is available at creation time can be accessed. By traced, it is meant that the object is monitored to learn information about the object, its data, its execution, its errors, its results, etc. One example of tracing an object is to measure an amount of time used to execute a task. Other examples include tracking how many times a task is performed, how many concurrent instances of a task are performed, the results of a task, etc.

In step 204 of FIG. 3, the existing code (that was accessed in step 202) is modified. Specifically, the portion of the existing code that creates the object (or other software entity) of interest is modified to add new functionality that accesses data available at the time the object is created. The modifications can include the changing of existing code and/or adding new code. For example, probe builder 4 may insert probes and agents into application 2. In step 206, the portion of the existing code that uses the object of interest is modified to add new functionality that traces the object. The tracing of the object results in the creation of trace data, which is stored with the data that was accessed at the time the object was created. In one embodiment, after step 206, the modified code is then stored. In step 208, the modified code is executed.

Figure 4:
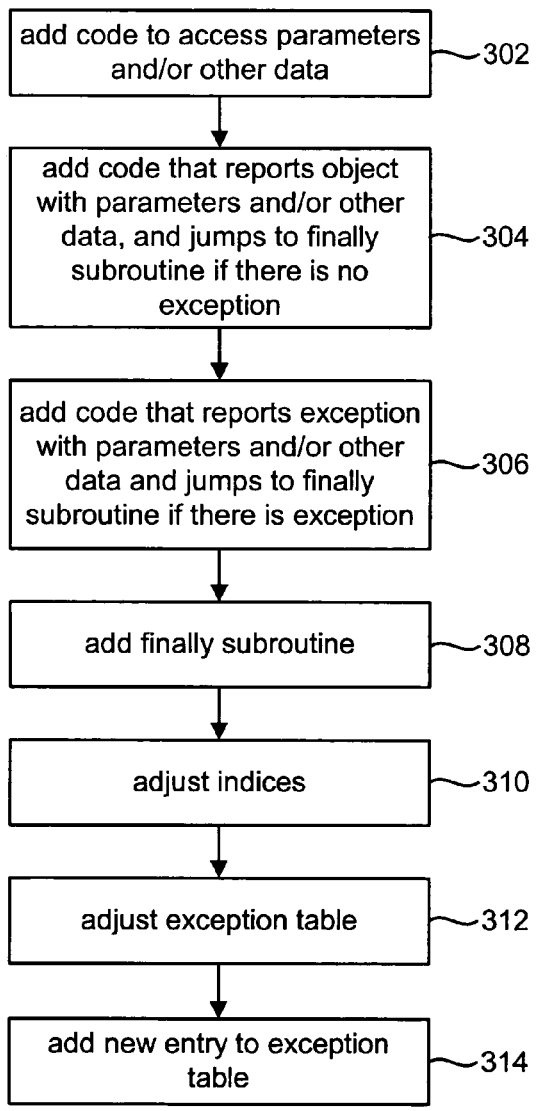
FIG. 4 is a flow chart describing one embodiment of a process for modifying code that creates an object.
Figure 5:
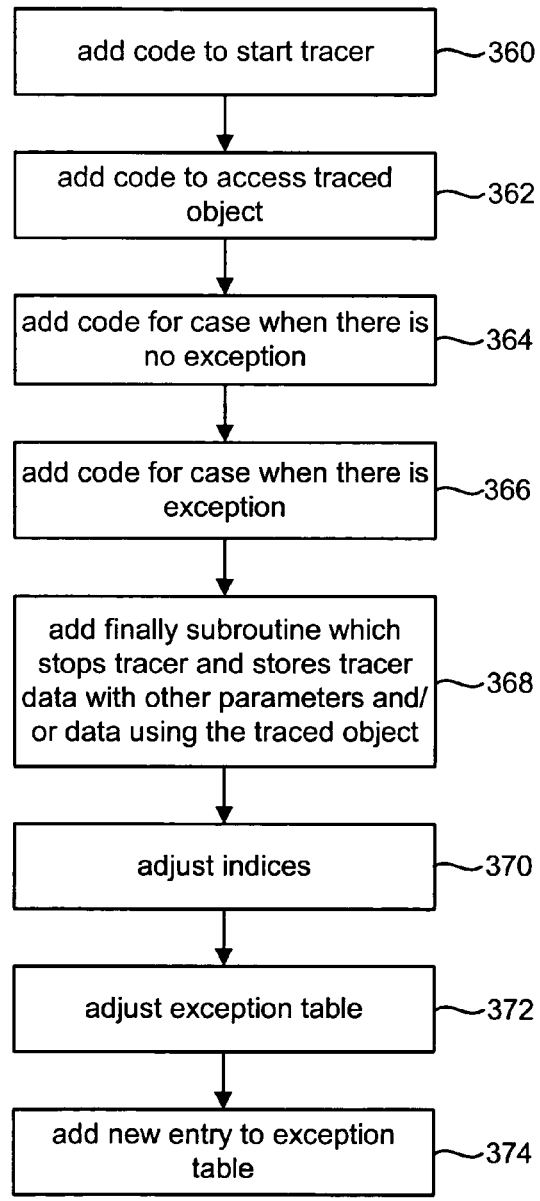
FIG. 5 is a flow chart describing one embodiment of a process for modifying code that uses an object.

FIGS. 4 and 5, which provide example implementations of steps 204 and 206, describe processes that include modifying object code. One embodiment of application performance analysis tool modifies object code by adding new code that activates a tracing mechanism (e.g. timer) when a method of concern starts and terminates the tracing mechanism when the method completes. In one implementation, the new functionality is added to a method such that all or part of the new functionality is executed upon exit from the method. Rather than add many copies of the exit code in different places, the tool adds exit code using "try" and "finally" functionality. To better explain this concept consider the following example pseudo code for a method called "exampleMethod." This method receives an integer parameter, adds 1 to the integer parameter, and returns the sum:

```
public int
exampleMethod(int x)
    {
    return x + 1;
    }
```

One embodiment of a performance analysis tool will modify this code, conceptually, by including a call to a tracer method, grouping the original instructions from the method in a "Try" block and adding a "Finally" block with code that stops the tracer. For example, the above code can be modified as follows:

```
public int
exampleMethod(int x)
    {
    IMethodTracer tracer = AMethodTracer.loadTracer(
        "com.wily.introscope.agent.trace.MethodTimer",
        this,
        "com.wily.example.ExampleApp",
        "exampleMethod",
        "name=Example Stat");
    try    {
        return x + 1;
        } finally    {
            tracer.finishTrace( );
        }
    }
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop the tracer and perform error handling. The method finishTrace calls doFinishTrace to actually stop the tracer. Within AMethodTracer, startTrace and finishTracer are final and void methods; and doStartTrace and doFinishTrace are protected, abstract and void methods. Thus, the methods doStartTrace and do FinishTrace must be implemented in subclasses of AMethodTracer. Each of the subclasses of AMethodTracer implement the actual tracers. The method loadTracer is a static method that calls startTrace and includes five parameters. The first parameter, "com.wily.introscope . . . " is the name of the class that is intended to be instantiated that implements the tracer. The second parameter, "this" is the object being traced. The third parameter "com.wily.example . . . " is the name of the class that the current instruction is inside of. The fourth parameter, "exampleMethod" is the name of the method the current instruction is inside of. The fifth parameter, "name= . . . " is the name to record the statistics under. The original instruction (return x+1) is placed inside a "Try" block. The code for stopping the tracer (a call to the static method tracer.finishTrace) is put within the Finally block.

The above example shows source code being modified. In one embodiment, the present invention doesn't actually modify source code. Rather, the present invention modifies object code. The source code examples above are used for illustration to explain the concept of the present invention. The object code is modified conceptually in the same manner that source code modifications are explained above. That is, the object code is modified to add the functionality of the "Try" block and "Finally" block. More information about such object code modification can be found in U.S. patent application Ser. No. 09/795,901, "Adding Functionality To Existing Code At Exits," filed on Feb. 28, 2001, incorporated herein by reference in its entirety. In another embodiment, the source code can be modified as explained above.

In one embodiment, the object code that is being modified is stored in a class data structure according to the Java Virtual Machine Specification. Each method of a class that is stored in a class data structure is described by a variable-length method_info structure. The structure has the following format:

```
method_info {
    u2 access_flags;
    u2 name_index;
    u2 descriptor_index;
    u2 attributes_count;
    attribute_info attributes
        [attributes_count];
}
```

The value of the access_flags item is a mask of modifiers used to describe access permission to and properties of a method. The access_flags modifiers are public, private, protected, static, final, synchronized, native and abstract. The value of the name_index item must be a valid index into the constant pool. The constant pool entry at that index is a valid Java method name. The value of the descriptor_index item must be a valid index into the constant pool representing a valid Java method descriptor. The value of the attributes_count item indicates the number of additional attributes of this method. Each value of the attributes table must be a variable-length attribute structure. A method can have code attributes and exception attributes.

The Code attribute is a variable-length attribute used in the attributes table of method_info structures. A Code attribute contains the Java virtual machine instructions for a single Java method, instance initialization method or class interface initialization method.

The Code attribute has the following format:

```
Code_attribute {
    u2 attribute_name_index;
    u4 attribute_length;
    u2 max_stack;
    u2 max_locals;
    u4 code_length
    u1 code [code_length];
    u2 exeption_table_length;
    {   u2 start_pc;
        u2 end_pc;
        u2 handler_pc;
        u2 catch_type;
    } exception_table
    [exception_table_length];
        u2 attributes_count;
        attribute_info attributes
    [attributes_count];
}
```

The attribute_name_index must be a valid index into the constant pool table. The constant pool entry at the index represents the string "Code." The value of the attribute_length item indicates the length of the attribute, excluding the initial six bytes. The value of the max_stack item gives the maximum number of words on the operand stack at any point during execution of this method. The value of the max_locals item gives the number of local variables used by this method, including the parameters passed to the method on invocation. The value of the code_length item gives the number of bytes in the code array for this method. The code array stores the actual bytes of code that implement the method. The exception_table_length provides the number of entries in the exception_table.

Each entry in the exception_table array describes one exception handler in the code array. Each exception_table entry contains the following items: start_pc, end_pc, handler_pc and catch_type. The values of start_pc and end_pc indicate the range in the code array at which the exception handler is active. The value of start_pc must be a valid index into the code array of the opcode of an instruction. The value of end_pc must be a valid index into the code array of the opcode of an instruction, or must be equal to code_length, the length of the code array. The value of start_pc must be less than the value of end_pc. Start_pc is inclusive and end_pc is exclusive. The value of handler_pc indicates the start of the exception handler code, is a valid index into the code array, is the index of the opcode of an instruction, and is less than the value of code_length. If the value of catch_type is non zero, then catch_type must be a valid index into the constant pool table. The constant pool entry at that index must be a structure representing a class of exceptions that this exception handler is designed to catch. This class must be the class Throwable or one of its subclasses. The exception handler will be called only if the thrown exception is an instance of the given class or one of its subclasses. If the value of the catch type item is 0, this exception handler is called for all exceptions—this is used to implement "finally." The value of the attributes_count item indicates the number of attributes in the code attribute. Each value of the attributes table must be a variable-length structure. The class file structure mentioned above is one example of the structure that is modified by Probe Builder 4. Other formats and file structures can also be used.

FIG. 4 is a flow chart describing one embodiment of a process for modifying code that creates an object (see step 204 of FIG. 3). In one embodiment, the process of FIG. 4 is performed by probe builder 4 to modify the object code for the method that creates the object. In step 302, code is added to that method to access parameters or other data of interest to the entity monitoring the application. In some embodiments, the data sought is data that is passed into the method as one or more parameters. In step 304, new code is added to the method in order to access the object created by that method. In one implementation, the code used to create the new object is put with in a "try" block, as described above. This new code will locally store the returned object, prepare the operand stack for a method invocation, invoke the method that will use/store the returned object and parameters (or other data), reset the operating stack with respect to the returned object, and jump to the "finally" block. This code added during step 304 is performed if there is no exception within the "try" block. In step 306, code is added to handle a case when there is an exception within the "try" block. That is, code is added that reports the exception and parameters/data, and jumps to the "finally" block. Step 306 includes adding code that accounts for exceptions when there are no explicit exception handlers. Step 306 also includes adding code to specific existing exception handlers. The exception handlers will be provided with bytecode that includes a jump to the bytecode for the "finally" block. The new bytecode added passes the exception to an agent object (or other structure, process, entity, method, etc.) for storage, statistical, or other purposes. In step 308, the bytecode for the "finally" block is added. In step 310, indices for the bytecode are adjusted. Because new bytecode was added, the indices for the code array may need to be changed. For example, instructions that follow new instructions have to be moved (change index) to make room for the new instructions. Additionally, references to bytecode within an instruction may also need to be adjusted. In step 312, the exception table for the method is adjusted. Because the indices of the bytecodes changed, the values of start_pc, end_pc, and handler_pc may need to be changed for existing exception handlers. Step 312 can also include adjusting other tables as appropriate to the particular implementation. In step 314, a new entry is added to the exception table. This new entry is for the new "finally" block. The new entry has a catch_type of zero, indicating it is for all exceptions. Additionally, the new entry in the exceptions table will be added to the end of the exceptions table. The start_pc and end_pc of the new entry are set to include the original Java instructions for the method being modified.

Below is an example of modifying code that creates an object. Consider the following source code that creates a PreparedStatement object:

```
public PreparedStatement
        prepareStatement(String sql) throws SQLException
{
    return new PreparedStatement(parseSQL(sql));
}
```

The corresponding byte code before modification is:

```
public prepareStatement(Ljava/lang/String;)Ljava/sql/PreparedStatement;
    throws java/sql/SQLException
    new com/vendor/jdbc/PreparedStatement
    dup
    aload_1
    invokestatic
com/vendor/jdbc/Connection/parseSQL(Ljava/lang/String;)
Lcom/vendor/jdbc/ParsedSQLStatement;
    invokespecial
com/vendor/jdbc/PreparedStatement/<init>
(Lcom/vendor/jdbc/Parsed SQLStatement;)V
    areturn
```

In one embodiment, the above byte code is modified to become:

0 ldc #60 <Integer 984897252>
2 ldc #55 <String "com/vendor/jdbc/Connection">
4 ldc #57 <String "prepareStatement">
6 ldc #59 <String "(Ljava/lang/String;)Ljava/sql/PreparedStatement;">
8 aload_0
9 ldc #62 <String ",com.wily.sqlagent.SQLStatementMapper,name=SQLAgent">
11 invokestatic #47 <Method com.wily.introscope.agent.trace.IParameterizedMethodTracer com.wily.introscope.agent.AgentShim.ProbeBuilderEntryPoint_loadParameterizedTracer(int, java.lang.String, java.lang.String, java.lang.String, java.lang.Object, java.lang.String)>
14 astore 12
16 aload 12
18 iconst_0
19 aload_1
20 invokeinterface (args 3) #92 <InterfaceMethod void IParameterizedMethodTracer_setParameter(int, java.lang.Object)>
25 aload 12
27 invokeinterface (args 1) #99 <InterfaceMethod void IMethodTracer_startTrace( )>
32 new #8 <Class com.vendorjdbc.PreparedStatement>
35 dup
36 aload_1
37 invokestatic #23 <Method com.vendorjdbc.ParsedSQLStatement com.vendorjdbc.Connection.parseSQL(java.lang.String)>
40 invokespecial #28 <Method PreparedStatement(com.vendorjdbc.ParsedSQLStatement)>
43 astore 13
45 aload 12
47 aload 13
49 invokeinterface (args 2) #96 <InterfaceMethod void IParameterizedMethodTracer_setReturnValue(java.lang.Object)>
54 jsr 80
57 aload 13
59 areturn
60 astore 11
62 aload 12
64 aload 11
66 invokeinterface (args 2) #102 <InterfaceMethod void IParameterizedMethodTracer_setThrownException(java.lang.Object)>
71 jsr 80
74 aload 11
76 athrow
77 nop
78 nop
79 nop
80 astore 10
82 aload 12
84 invokeinterface (args 1) #53 <InterfaceMethod void IMethodTracer_finishTrace( )>
89 ret 10
91 nop
Exception table:
    from to target type
    32 60 60 <Class all>

In the above code, the instruction at index 19 (aload_1) accesses the SQL parameter (see step 302 of FIG. 4). The original functionality corresponds to indices 32-43. The code at indices 47-59 reports the returned object (see step 304 of FIG. 4), The code at indices 60-71 handles the case when there is an exception (see step 304 of FIG. 4). The code at indices 74-91 implements the Finally block.

With the above modifications, the tracer gets access to both the original SQL and the PreparedStatement object generated from that SQL, and can establish a relationship between the two. For example, the following code creates a hash table of PreparedStatement objects to SQL statements:

```
class SQLStatementMapper
{
    public static Hashtable statementsToSQL = new Hashtable( );
    public void
    finishTrace( )
    {
        statementsToSQL.put(getReturnValue( ), getParameter(1));
    }
}
```

Note that the above code is just one example of how to perform the present invention. Many other variations of modifying code can also be performed within the spirit of the present invention.

FIG. 5 is a flow chart describing one embodiment of a process of modifying the code that uses an object (see step 206 of FIG. 3). In one embodiment, the process of FIG. 5 is performed by probe builder 4 to modify a method that uses the object of concern. In step 360, new bytecode is added that starts a tracer. In one embodiment, all of the instructions that will be traced will be put within a "try" block. In some implementations, all of the code for the method being modified is positioned within a "try" block. In other embodiments, only a subset of instructions will be within the "try" block. In step 362, new code is added to the method to access the object being traced. In step 364, new code is added to account for the situation when there is no exception—that is, when the instructions are performed without any exceptions. After the original instructions are performed, the new "finally" block must be executed. The original code is modified to include a jump to the bytecode for the "finally" block. In step 366, new byte code is added to the code array that accounts for the situation when there are exceptions. For exceptions where there are no existing exception handlers, a generic exception handler is added which jumps to the "finally" block. If there are existing exception handlers already in the method, each of those exception handlers are modified to include a jump to the "finally" block. In step 368, the "finally" block is added to the code. This "finally" block stops the tracer and stores the trace data from the tracer. The "finally" block stores the tracer data with the parameters or other data that was accessed by code added in step 302 of FIG. 4. The trace data is correlated to that set of parameters/data using the object that was accessed in step 362. The object in step 362 should be the same object that was accessed and reported in step 304. In one embodiment, step 304 includes placing the object and the parameters/data in a hash table. In step 368, the object is used to locate the parameters/data in that hash table and store the trace data with the parameters/data.

In step 370, the indices in the bytecode are adjusted. That is, the system added new code; therefore, subsequent instructions need to be moved (e.g. change index). In addition, references to bytecode within an instruction may need to be adjusted. For example, the point of reference for a jump or branch instruction may need to be adjusted.

In step 372, the exception table is adjusted. That is, because the indices of the bytecodes changed, the values of start_pc, end_pc and handler_pc may need to be changed for existing exception handlers. As described above, each entry in an exception table indicates a range of code in the code array that pertains to the particular exception handler. Because the coding indices were shifted, indices in the exception table must also shift accordingly. If the location of the exception handler code moved in the code array, then handler_pc must also change accordingly. Step 372 can also include adjusting other tables in the class file, as appropriate to the particular implementation. In step 374, a new entry is added to the exception table. This new entry correlates to the new "finally" block. The new entry has a catch_type of zero, indicating it is for all exceptions.

Below is an example of modifying code that uses an object. Consider the following source code:

```
public ResultSet
executeQuery( ) throws SQLException
    {
    lastResultSet = coreExecuteQuery( );
    return lastResultSet;
    }
```

The corresponding byte code is:

```
public executeQuery( )Ljava/sql/ResultSet; throws
    java/sql/SQLException
    invokespecial
com/vendor/jdbc/PreparedStatement/coreExecuteQuery( )
Ljava/sql/ResultSet;
    dup
    putfield com/vendor/jdbc/PreparedStatement/lastResultSet
Ljava/sql/ResultSet;
    areturn
```

In one embodiment, the above byte code is modified to become:

0 ldc #107 <Integer 867609586>

2 ldc #55 <String "com/vendor/jdbc/PreparedStatement">

4 ldc #104 <String "executeQuery">

6 ldc #106 <String "( )Ljava/sql/ResultSet;">

8 aload_0

9 ldc #109 <String ",com.wily.sqlagent.SQLQueryTimer, name=SQLAgent">

11 invokestatic #47 <Method com.wily.introscope.agent.trace.IParameterizedMethodTracer com.wily.introscope-.agent.AgentShim.ProbeBuilderEntryPoint_loadParameterizedTracer(int, java.lang.String, java.lang.String, java.lang.String, java.lang.Object, java-.lang.String)>

14 astore 12

16 aload 12

18 invokeinterface (args 1) #99 <InterfaceMethod void IMethodTracer_startTrace( )>

23 nop 24 invokespecial #25 <Method java.sql.ResultSet coreExecuteQuery( )>

27 dup 28 putfield #36 <Field java.sql.ResultSet lastResultSet>

31 astore 13

33 aload 12

35 aload 13

37 invokeinterface (args 2) #96 <InterfaceMethod void IParameterizedMethodTracer_setReturnValue(java-.lang.Object)>

42 jsr 68

45 aload 13

47 areturn 48 astore 11

50 aload 12

52 aload 11

54 invokeinterface (args 2) #102 <InterfaceMethod void IParameterizedMethodTracer_setThrownException(java-.lang.Object)>

59 jsr 68

62 aload 11

64 athrow 65 nop 66 nop 67 nop 68 astore 10

70 aload 12

72 invokeinterface (args 1) #53 <InterfaceMethod void IMethodTracer_finishTrace( )>

77 ret 10

79 nop

Exception table:
   from to target type
      24 48 48 <Class all>

The code at indices 24-28 and 47 corresponds to the original functionality. The code at indices 0-23 starts the tracer. The code at indices 31-45 accesses the traced object returned. The code at indices 48-59 is performed for exceptions. The code at indices 62-79 implements the Finally block.

This tracer is free to use the previously captured information about its current object context. For example, it can time the method and attribute that time to the SQL string used to generate the PreparedStatement.

```
class SQLQueryTimer
{
    private long startTime;
    public void
    startTrace( )
    {
        startTime = System.currentTimeMillis( );
    }
    public void
    finishTrace( )
    {
        long totalTime = System.currentTimeMillis( ) - startTime;
        String sql = (String)
SQLStatementMapper.statementsToSQL.get(getThis( ));
        // can now attribute totalTime to the sql that caused it
        System.out.println (sql + "took" + totalTime + "milliseconds");
    }
}
```

Note that the above code is just one example of how to perform the present invention. Many other variations of modifying code can also be performed within the spirit of the present invention. One example implementation of the present invention is used with a Java application that establishes a connection to a relational database. The java.sql. Connection interface can be used to create a connection object representing a particular database connection. The "prepareStatement" method of the connection object is modified according to the process of FIG. 4. The "prepareStatement" method, which creates a prepared statement object, includes a parameter representing the SQL command. Step 302 of FIG. 4 includes adding code that accesses that SQL command. Step 304 of FIG. 4 includes adding code that accesses the prepared statement object returned by the "prepareStatement" method and stores that object with the SQL statement in a hash table. The "executeQuery" method of the prepared statement object can be modified according to the process of FIG. 5 in order to start a timer when the method starts and stop the timer when the method stops. After the timer is stopped, the code added in step 368 will access the traced prepared statement object and use that prepared statement object to access the hash table entry for the SQL statement. The trace data (e.g., the amount of time it took to execute the SQL command) will be stored with the SQL command. Thus, when the application is completed, there will be a data structure storing each of the SQL commands and the time it took to execute each of those commands. Additional code can be included to report that data, determine statistics about that data (e.g., average time, mean time, longest time, shortest time, times outside the predetermined range, etc.) and report the data as well as the statistics. The present invention can be used for other types of connections, and other code which creates objects for which information is available at object creation time and not necessarily at all other times.

Figure 6:
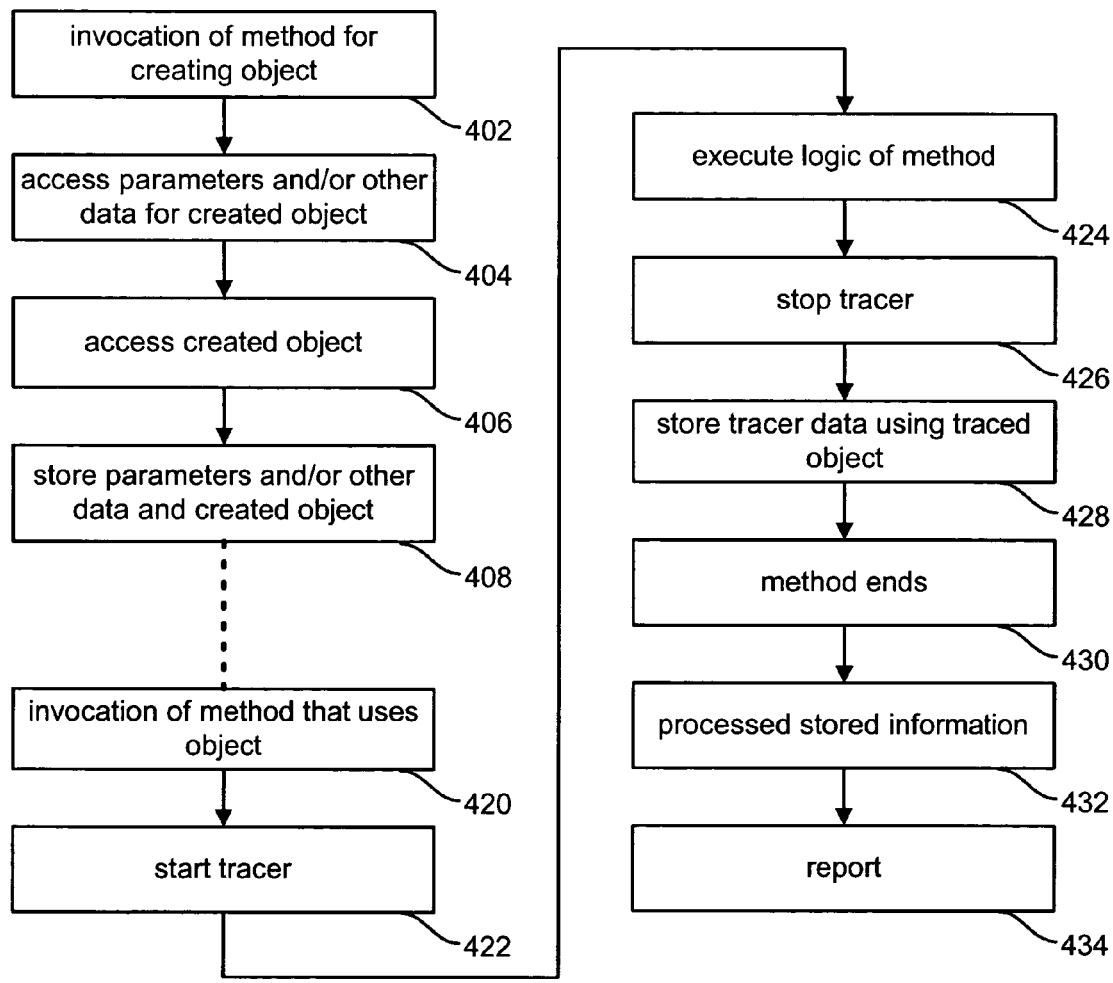
FIG. 6 is a flow chart describing one embodiment of a process for executing the modified code.

FIG. 6 is a flow chart describing one embodiment of the process for executing the code after being modified as described above. In step 402, the method that creates the object of concern is invoked. Thus, the application is already running and the method which creates the object (e.g., the "prepareStatement" method) is invoked. In step 404, the parameters and/or other data for that method are accessed for the created object. In step 406, the actual object that is created is accessed. In step 408, the new code stores the parameters (or other data) and the created object. As described above, one example includes storing information in a hash table.

Between steps 408 and 420, there is a dotted line indicating that many other actions can happen (but are not required to happen) between step 408 and 420. In step 420, the method that uses the object (e.g., the "executeQuery" method) is invoked. In step 422, the tracer for that method is started. For example, a timer can be started. In step 424, the logic of that method is executed (e.g., the SQL query is performed). In step 426, the tracer is stopped. In step 428, the tracer data is stored with the other parameters and/or other information stored in step 408. The tracer data is correlated to the parameters using the traced object. In step 430, the method (e.g., the "executeQuery" method) ends. In step 432, the information stored (e.g., the trace data, parameters, or other data, etc.) is processed. In step 434, this processed information is reported back to an entity (e.g., human, software process, data structure, or other entity, etc.). Note that in some implementations, some of the steps of the flow charts described above can be combined.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for adding functionality in order to access information, comprising:
   automatically modifying a first portion of existing code, said modifying said first portion of existing code includes adding first additional code to said first portion of existing code, said first portion of existing code creates a software entity, said first additional code stores first data relevant to said software entity, said first data is available when said first software entity is created; and
   automatically modifying a second portion of existing code, said modifying said second portion of existing code includes adding second additional code to said second portion of existing code, said second portion of existing code uses said software entity, said second additional code accesses second data relevant to said software entity and correlates said second data with said first data.

2. A method according to claim 1, wherein:
   said first portion of existing code and said second portion of existing code are part of a single application.

3. A method according to claim 1, wherein:
said second data relevant to said software entity includes information about use of said software entity.

4. A method according to claim 1, wherein:
said software entity is an object.

5. A method according to claim 1, wherein:
said first portion of existing code and said second portion of existing code are object code.

6. A method according to claim 1, wherein:
said first portion of existing code and said second portion of existing code are Java object code.

7. A method according to claim 1, wherein:
said first portion of existing code is part of a larger set of code; and
prior to said step of automatically modifying said first portion of existing code, said first data is not always made available by said larger set of code.

8. A method according to claim 1, further comprising the steps of:
executing said first additional code with said first portion of existing code; and
executing said second additional code with said second portion of existing code.

9. A method according to claim 1, further comprising the steps of:
storing said first additional code with said first portion of existing code; and
storing said second additional code with said second portion of existing code.

10. A method according to claim 1, wherein:
said second additional code traces said software entity in order to produce trace data; and
said second data includes said trace data.

11. A method according to claim 10, wherein:
said software entity is an object;
said first additional code stores said object with said first data;
said second additional code uses said object to correlate said trace data with said first data.

12. A method according to claim 1, wherein:
said software entity is an object that pertains to a connection.

13. A method according to claim 1, wherein:
said first data indicates an SQL statement;
said software entity is an object that pertains to said SQL statement;
said first portion of existing code receives said SQL statement;
said first additional code stores said SQL statement and said object;
said second additional code traces a use of said object and produces resulting trace data, said second additional code stores said trace data with said first data; and
said second portion of existing code causes the execution of said SQL statement.

14. A machine implemented method for adding functionality in order to access information, comprising:
automatically adding first additional object code to a first portion of existing object code, said first portion of said existing object code creates a software entity, said first additional object code stores first data relevant to said software entity, said first data is available to said existing object code when said first software entity is created; and
automatically adding second additional object code to a second portion of said existing object code, said second portion of said existing object code uses said software entity, said second additional object code accesses second data relevant to said software entity and correlates said second data with said first data after said second data is accessed.

15. A method according to claim 14, wherein:
said software entity is an object; and
said first existing code and said second existing code are object code.

16. A method according to claim 14, wherein:
said step of adding second additional code includes adding code that traces said software entity and produces trace data, said second data includes said trace data; and
said step of adding second additional code further includes adding code that stores said trace data with said first data using said first software entity to correlate said trace data with said first data.

17. A method according to claim 14, wherein:
said software entity is an object;
said step of adding first additional code includes adding code that stores said object with said first data; and
said step of adding second additional code includes adding code that uses said object to correlate said second data with said first data.

18. A method according to claim 14, wherein:
said first data indicates an SQL statement;
said software entity is an object that pertains to said SQL statement;
said first existing code receives said SQL statement;
said second existing code causes the execution of said SQL statement;
said step of adding first additional code includes adding code that stores said SQL statement and said object; and
said step of adding second additional code includes adding code that traces a use of said object thereby producing trace data and stores said trace data with said first data.

19. One or more processor readable storage devices, comprising:
processor readable code embodied on said processor readable storage devices, said processor readable code for programming one or more processors automatically adds first additional code to first existing code, said first existing code creates a software entity, said first additional code stores first data relevant to said software entity, said first data is available when said software entity is created, said processor readable code automatically adds second additional code to second existing code, said second existing code uses said software entity, said second additional code accesses second data relevant to said software entity and correlates said second data with said first data after said second data is accessed.

20. One or more processor readable storage devices according to claim 19, wherein:
said software entity is an object; and
said first existing code and said second existing code are object code.

21. One or more processor readable storage devices according to claim 19, wherein:
said step of adding second additional code includes adding code that traces said software entity and produces trace data, said second data includes said trace data; and
said step of adding second additional code further includes adding code that stores said trace data with said first data using said software entity to correlate said trace data with said first data.

22. One or more processor readable storage devices according to claim 19, wherein:
said software entity is an object;
said step of adding first additional code includes adding code that stores said object with said first data; and
said step of adding second additional code includes adding code that uses said object to correlate said second data with said first data.

23. One or more processor readable storage devices according to claim 19, wherein:
said first data indicates an SQL statement;
said software entity is an object that pertains to said SQL statement;
said first existing code receives said SQL statement;
said second existing code causes the execution of said SQL statement;
said step of adding first additional code includes adding code that stores said SQL statement and said object; and
said step of adding second additional code includes adding code that traces a use of said object thereby producing trace data and stores said trace data with said first data.

24. An apparatus for adding functionality in order to access information, comprising:
a communication interface;
a storage device; and
one or more processors, said one or more processors in communication with said communication interface and said storage device, said one or more processors automatically adds first additional code to first existing code, said first existing code creates a software entity, said first additional code stores first data relevant to said first software entity, said first data is available when said software entity is created, said one or more processors automatically adds second additional code to second existing code, said second existing code uses said software entity, said second additional code accesses second data relevant to said software entity and correlates said second data with said first data after said second data is accessed to produce correlation data, said one or more processors reports said correlation data to an output device.

25. An apparatus according to claim 24, wherein:
said software entity is an object; and
said first existing code and said second existing code are object code.

26. An apparatus according to claim 24, wherein:
said step of adding second additional code includes adding code that traces said software entity and produces trace data, said second data includes said trace data; and
said step of adding second additional code further includes adding code that stores said trace data with said first data using said software entity to correlate said trace data with said first data.

27. An apparatus according to claim 24, wherein:
said software entity is an object;
said step of adding first additional code includes adding code that stores said object with said first data; and
said step of adding second additional code includes adding code that uses said object to correlate said second data with said first data.

28. An apparatus according to claim 24, wherein:
said first data indicates an SQL statement;
said software entity is an object that pertains to said SQL statement;
said first existing code receives said SQL statement;
said second existing code causes the execution of said SQL statement;
said step of adding first additional code includes adding code that stores said SQL statement and said object; and
said step of adding second additional code includes adding code that traces a use of said object thereby producing trace data and stores said trace data with said first data.

29. A method for adding functionality in order to access information, comprising:
accessing existing code that creates a software entity and uses said software entity; and
after said accessing, automatically modifying said existing code, said modifying includes adding first additional code and second additional code to said existing code, said first additional code stores first data relevant to said software entity at time of creation of said software entity, said second additional code accesses second data relevant to said software entity and correlates said second data with said first data.

30. A method according to claim 29, wherein:
said software entity is an object;
said object pertains to an SQL statement; and
said first data indicates said SQL statement.

31. A method according to claim 30, wherein:
said modified existing code causes a performance of said SQL statement; and
said second data includes trace data that indicates a time for performing said SQL statement.

32. A method for adding functionality in order to access information, comprising:
accessing existing code that creates a software entity and uses said software entity; and
after said accessing, automatically adding first additional code and second additional code to said existing code, said first additional code stores first data relevant to said software entity at time of creation of said software entity, said second additional code accesses second data relevant to said software entity and correlates said second data with said first data.

33. A method according to claim 32, wherein:
said software entity is an object;
said first data represents an SQL statement;
said object pertains to said SQL statement;
said existing code receives and executes said SQL statement; and
said second data is trace data that includes information about how long said SQL statement executes.

* * * * *